Nov. 13, 1934.                    W. VETTER                    1,980,239
                    PLANT SUPPORT FOR GREENHOUSE BENCHES
                            Filed Oct. 5, 1932
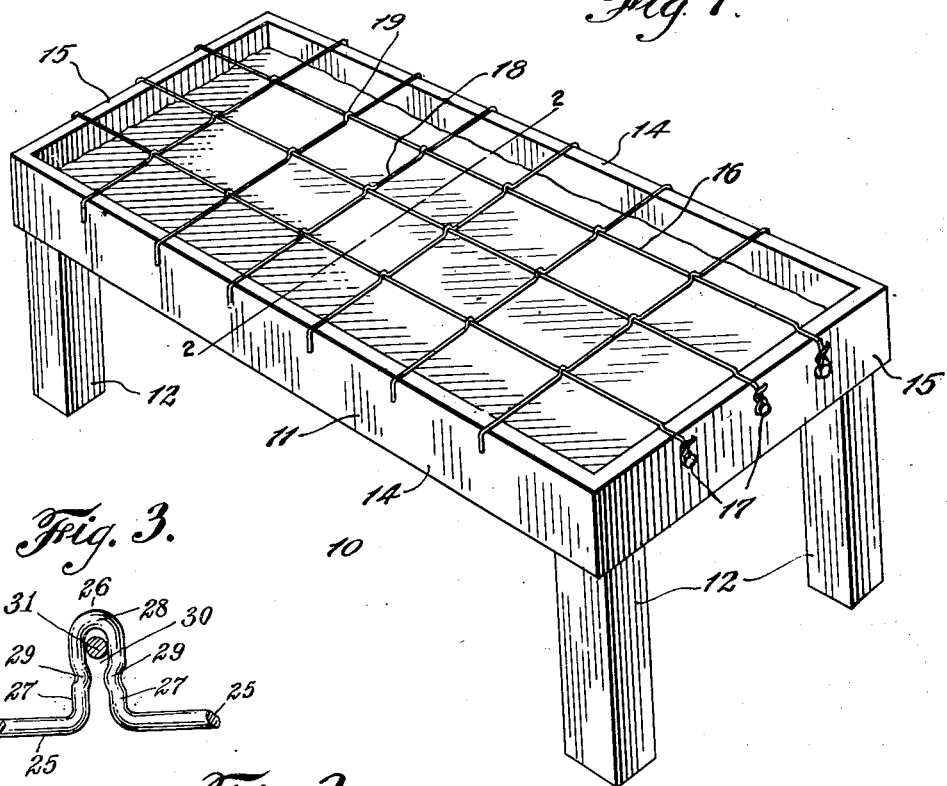
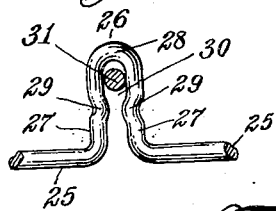
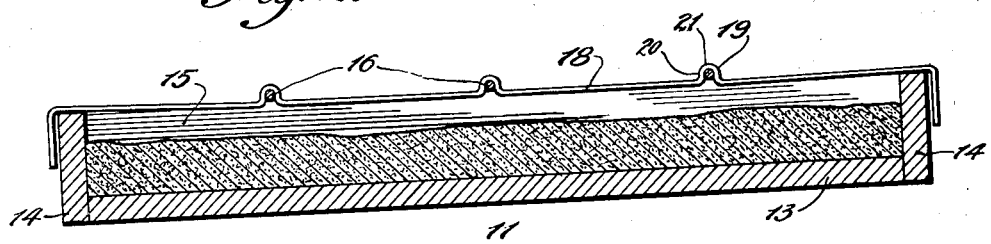
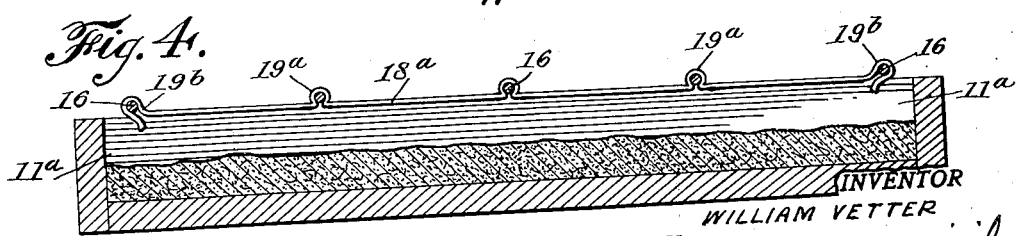
INVENTOR
WILLIAM VETTER
BY
his ATTORNEY Patented Nov. 13, 1934

1,980,239

UNITED STATES PATENT OFFICE 1,980,239

PLANT SUPPORT FOR GREENHOUSE BENCHES

William Vetter, Patchogue, N. Y.

Application October 5, 1932, Serial No. 636,272

4 Claims. (Cl. 47—44)

My invention relates to improvements in greenhouse benches, and the same has for its object to provide a simple, efficient and inexpensive construction for maintaining the plants properly supported in spaced relation in the bed or receptacle.

Further, said invention has for its object to provide a greenhouse bench with readily adjustable and removable means for maintaining the plants duly positioned and separated in the bed or receptacle.

Further, said invention has for its object to provide a greenhouse bench with removable, adjustable means whereby to separate or divide the bench or receptacle into spaces of variable predetermined sizes.

Further, said invention has for its object to provide a greenhouse bench with fixed means dividing the bench into longitudinal spaces or lanes of predetermined width, and slidable means engaging fixed means for varying the size of the spaces for the plants.

Other objects will in part be obvious and in part be pointed out hereinafter.

To the attainment of the aforesaid objects and ends my invention consists in the novel features of construction, and in the combination, connection and arrangement of parts hereinafter more fully described and then pointed out in the claims.

In the accompanying drawing—

Figure 1 is a perspective view showing a greenhouse bench with one form of plant spacing and separating means constructed according to, and embodying my said invention;

Fig. 2 is a transverse section on the line 2—2 of Fig. 1;

Fig. 3 is a face or side view illustrating a modified form of loop, and

Fig. 4 is a section similar to Fig. 2 illustrating a modification.

In said drawing 10 designates a greenhouse bench of usual general construction comprising a top tray or plant receptacle 11 supported upon legs 12. The top tray or receptacle which is preferably made of wood includes a bottom 13, side rails 14, and end rails 15.

In order to maintain the plants properly spaced and supported the top frame or receptacle 11 is provided with a series of longitudinal supporting wires 16 which are stretched across the top of the receptacle 11, and fixedly secured to the outer sides of the end rails 15 by bending or looping the ends of said wires over nails or pegs 17 fixed in the end rails 15. The wires 16 are preferably arranged parallel and spaced about eight inches apart.

18 denotes adjustable transverse members which are formed of wire similar to that of the longitudinal wires 16. The members 18 are provided at intervals of about eight inches with upwardly-extending U-shape loops 19, comprising vertical side portions 20 terminating in rounded or semi-circular ends 21. The space between the vertical portions 20 of the loops 19 is such that when the longitudinal wires 16 are introduced into said loops 19 they will be held frictionally in engagement with said loops. The ends of said transverse members or wires 18 may merely be bent downwardly over the edges of the longitudinal side rails 14, to permit of the free adjustment of said transverse members, or they may be bent or looped over nails or pegs fixed in the outer sides of said side rails 14 similar to the nails or pegs 17 in the ends 15.

In the modification illustrated at Fig. 3 the transverse member or wire 25 is provided at regular intervals preferably about every eight inches, with upwardly extending substantially U-shape loops 26 comprising parallel vertical side members 27 terminating in a rounded end 28. The intermediate portions of said side members 27 are provided with oppositely-arranged inwardly projecting rounded portions 29 which terminate adjacent to each other, and form between the same and the rounded end 28 of the loop retaining eye 30 which conforms to the cross-sectional area of the longitudinal wire 31 enclosed and retained thereby.

In practice the transverse members or wires 18, 25 may be formed in long lengths which may be suitably reeled or coiled, and severed into lengths of suitable size as required by the user.

It is to be noted that in applying the spacing and supporting means the longitudinal wires 16 or 31, as the case may be, are first properly positioned upon the plant receptacle 11, and thereupon the transverse members or wires 18 or 25, are disposed upon the wires 16, 31, and the loops thereof engaged with the several longitudinal wires 16, 31, respectively. The transverse wires 18, 25 are then adjusted to desired position thereon, and the ends thereof bent downwardly over the side rails 14 of the plant receptacle 11, and suitably secured to the nails or pegs fixed thereon.

In the modification illustrated at Fig. 4 the transverse members 18ª are provided at intervals with upwardly extending loops 19ª, as in the main construction, and at their opposite ends with downwardly and inwardly extending hooks 19ᵇ which are adjustably disposed upon longitudinal supporting wires 16 arranged in close proximity to the opposite longitudinal side rails of the tray 11ᵃ. This arrangement permits of the more convenient attachment and detachment of the transverse members 18ᵃ.

Having thus described my said invention, what I claim and desire to secure by Letters Patent is:

1. A greenhouse bench comprising a plant receptacle, a series of fixed supporting wires arranged in spaced relation to each other and extending longitudinally of said receptacle and secured at their opposite ends to the opposite ends of said receptacle, a series of adjustable transverse spacing wires, a plurality of loops arranged at intervals on said transverse spacing wires and extending at right angles therefrom, and registering inwardly extending projections on said loops disposed between the open and closed ends thereof, for confining the portions of said longitudinal supporting wires engaged by said loops in position adjacent to the closed ends thereof.

2. A device of the character described comprising a length of wire, means at the opposite ends thereof for securing the same to a support, and a plurality of integrally formed loops extending at intervals outwardly at right angles thereto, and registering inwardly extending projections on opposite sides of said loop inwardly of its open end forming between the same and the closed end of the loop an eye to receive and hold a cooperating wire therein.

3. A device of the character described comprising a length of wire, and a plurality of integrally formed loops extending at intervals outwardly at right angles thereto, said loops each including a pair of parallel side portions terminating in a rounded end, and offset portions in said side portions intermediate the body of said wire and the rounded end of said loop to receive and retain a cooperating wire therein.

4. A device of the character described comprising a length of wire, securing means at the opposite ends thereof, and a plurality of loops arranged in spaced relation on said wire and extending at intervals outwardly therefrom, each of said loops including a pair of side members, and inwardly-extending registering projections disposed substantially midway between the open and closed ends of the loop and adapted to receive and retain a cooperating wire.

WILLIAM VETTER.